United States Patent
Zavora et al.

(10) Patent No.: US 11,036,678 B2
(45) Date of Patent: Jun. 15, 2021

(54) OPTIMIZING FILES STORED IN A DISTRIBUTED FILE SYSTEM

(71) Applicant: Aetna Inc., Hartford, CT (US)

(72) Inventors: Aaron Zavora, Wexford, PA (US); Jason Figura, Pittsburgh, PA (US); Daniel J. Markwat, Arlington, MA (US)

(73) Assignee: Aetna Inc., Hartford, CT (US)

( * ) Notice: Subject to any disclaimer, the term of this patent is extended or adjusted under 35 U.S.C. 154(b) by 246 days.

(21) Appl. No.: 16/020,422

(22) Filed: Jun. 27, 2018

(65) Prior Publication Data

US 2020/0004840 A1 Jan. 2, 2020

(51) Int. Cl.
*G06F 16/00* (2019.01)
*G06F 7/00* (2006.01)
*G06F 16/13* (2019.01)
*G06F 16/182* (2019.01)

(52) U.S. Cl.
CPC ............ *G06F 16/13* (2019.01); *G06F 16/182* (2019.01)

(58) Field of Classification Search
CPC .............................. G06F 16/134; G06F 16/182
USPC ........................................................ 707/827
See application file for complete search history.

(56) References Cited

U.S. PATENT DOCUMENTS

| | | | |
|---|---|---|---|
| 2011/0106806 A1* | 5/2011 | Tamas ................ | G06F 16/1824 707/737 |
| 2017/0212680 A1* | 7/2017 | Waghulde ............ | G06F 16/185 |
| 2018/0121127 A1* | 5/2018 | Zhang .................. | G06F 3/0643 |

OTHER PUBLICATIONS

Sabharwal, Neeraj, "Small Files in Hadoop," https://community.hortonworks.com/articles/15104/small-files-in-hadoop.html (Feb. 8, 2016).
"The Small Files Problem," Cloudera Engineering Blog, https://blog.cloudera.com/blog/2009/02/the-small-files-problem/ (Feb. 2, 2009).

* cited by examiner

*Primary Examiner* — Raquel Perez-Arroyo
(74) *Attorney, Agent, or Firm* — Leydig, Voit & Mayer, Ltd.

(57) ABSTRACT

Methods and systems for optimizing a number of files stored in a distributed file system are provided. The method includes determining whether the size of a plurality of input files in a directory are less than a block size. The method further includes determining whether the size of the input files in the directory divided by a desired file size is greater than a threshold. Additionally, the method includes combining the collection of input files into a reduced set of files.

12 Claims, 6 Drawing Sheets

OPTIMIZING FILES STORED IN A DISTRIBUTED FILE SYSTEM

FIELD

The present invention relates to a method and system for improving performance in a distributed file system.

BACKGROUND

A distributed file system (DFS) is a file system with data stored on one or more servers. The data may be accessed and processed as if it was stored on a local client machine. In a DFS, files can be accessed and shared among users on a network. A DFS may include a permissions system to allow for the accessing of a file only by authorized users. One exemplary distributed file system is Apache Hadoop. Hadoop is an open-source software framework. A DFS may be used to store and process large datasets.

Distributed file system may suffer performance degradation when a large number of small files are present. A large number of small files can cause excessive overhead on the system resources. Network resources, memory, processor utilization and other computing resources may all be adversely affected by a large number of small files stored in a distributed file system.

SUMMARY

In an embodiment, a method for optimizing a number of files stored in a distributed file system is provided. The method includes determining whether the size of a plurality of input files in a directory are less than a block size. The method further includes determining whether the size of the input files in the directory divided by a desired file size is greater than a threshold. Additionally, the method includes combining the collection of input files into a reduced set of files.

In another embodiment, a distributed file system comprising one or more processors which, alone or in combination, are configured to provide for performance of a number of steps is provided. The steps include determining whether the size of input files in a directory are less than a block size. The steps further include determining whether the size of the input files in the directory divided by a desired file size is greater than a threshold. The steps also include combining the collection of input files into a reduced set of files.

In another embodiment, a non-transitory computer readable medium storing instructions that when executed by a processor perform a number of steps is provided. The steps include determining whether the size of input files in a directory are less than a block size. The steps further include determining whether the size of the input files in the directory divided by a desired file size is greater than a threshold. The steps also include combining the collection of input files into a reduced set of files.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings.

DETAILED DESCRIPTION

A problem unique to distributed file systems and solved by embodiments of the present invention is reduced performance as a result of many small files stored in the distributed file system. Embodiments improve the performance of a distributed filed system. One exemplary distributed file system is Hadoop. The Hadoop Distributed File System (HDFS) may be referred to throughout the disclosure in reference to various embodiments. However, the disclosure may be used with any distributed file system as appropriate.

Performance in a distributed file system is adversely affected many "small" files stored in the system. Storing many small files is detrimental to process performance. Embodiments alleviate the performance issues by combining these small files into a set of larger files. Combining the small files into larger files reduces process overhead, memory, and CPU time. Embodiments reduce the memory footprint in a distributed file system namenode as well as IO traffic between the namenode and datanodes.

Figure 1:
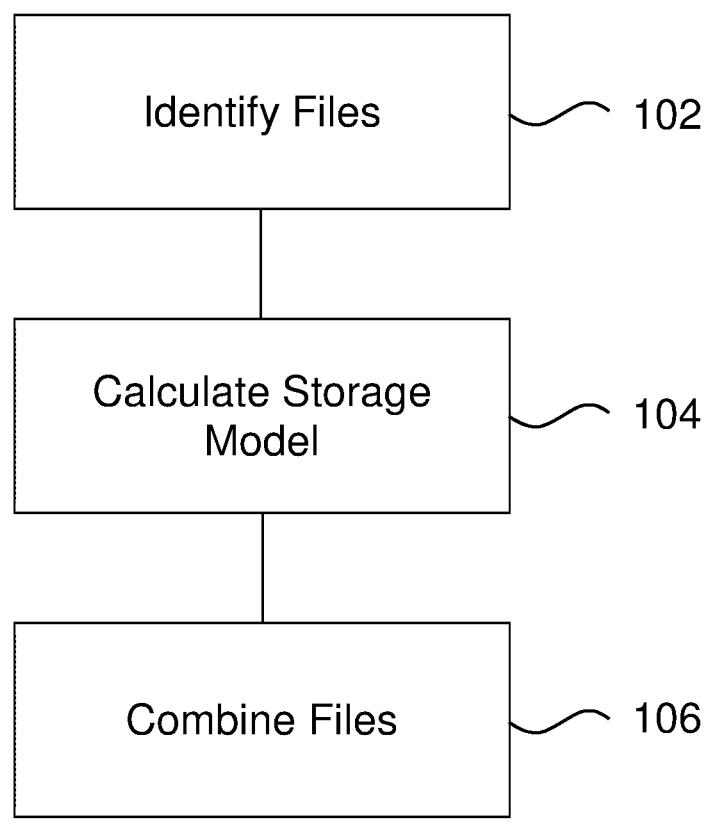
FIG. 1 illustrates a method for improving the efficiency of a distributed file system according to an embodiment.

FIG. 1 illustrates a method, according to an embodiment, for improving the efficiency of a distributed file system. At step 102, collections of files considered to be a burden to the system are identified. For example, all files under a certain size threshold may be identified. In one embodiment, all files in a directory under 512 MB may be identified. At step 104, an efficient storage model for the given set of files is calculated. At step 106 the files are combined into the calculated storage model. In one embodiment, the files may be combined using MapReduce function Hadoop. MapReduce is a programming model and an associated implementation. It is used for processing and generating big data sets. MapReduce is a programming model implemented on a distributed file system for processing and generating big data sets. MapReduce consists of a map function which generates key/value pairs as well as a reduce function that merges like keys for processing. MapReduce on a distributed file system executes in parallel across the machines in the cluster. Each of the steps in FIG. 1 are described in more detail below.

Embodiments of the invention lessen the number of empty or near empty file parts the system has to maintain. On the system, each file part takes approximately 150 bytes. Decreasing the number of bytes needed to search in order to access a file coupled with millions of file access requests per day results in a system operating more efficiently for all consumers.

In some embodiments, an optimization of the ratio of the total bytes per block used to the total bytes of blocks allocated is performed. Embodiments may be used on a given unordered sequence of blocks. One or more blocks contain the data for a file. Generally, in a file, unused allocated bytes only appear in the last block of a-file. Therefore, another block may exist with additional data for the file. Having multiple unused allocated bytes at the end of a block typically result in more unnecessary blocks. In a fully optimized system one or zero partially used blocks would exist at the end of a file and everything would exist in a single file.

However, to fully optimize a file requires considerable computer resources and computational time. Therefore, embodiments weigh the time and computational effort to condense the file to a single part against the computational inefficiency of having multiple file parts. In some embodiments, the system dynamically determines the optimal number of parts for a given file. In other embodiments, the number of file parts is derived by an approximate function that is predetermined.

The more file parts that exist per file, the less efficient the space usage of that file. The network effect of this is more execution units need to be allocated in execution engines to handle more of these nearly-empty blocks. As a result, the filesystem needs more records for the increased number of file parts. Removing the unused bytes by concatenating file parts together yields a more efficient filesystem by reducing the number of allocated blocks. Therefore, in some embodiments, execution systems that use the condensed files require fewer file open commands to be issued in favor of more seeks. File seek commands are generally more efficient than file open commands.

In some embodiments, a collection of files that utilize on average <75% of its blocks are marked for restructuring. In FIG. 1, this occurs at step 102. In some embodiments, the size of all files in a directory is calculated during step 102. This is the sum of the full blocks plus the sum of the part of the partially used blocks divided by the total number of blocks used.

The storage model is determined at step 104. In some embodiments, an optimal storage structure utilizes at least 3 out of 4 blocks in the file system. This storage structure results in a minimum allocation utilization of greater than 75% and the median is 87%. The only exception to this is when the sum of the size of a collection of file parts is not at the minimum block size in which case all file parts are combined into one file. This results in the optimal storage for this scenario.

In some embodiments the utilization is greater than 75%. The minimal utilization percentage increases linearly proportional to the size and number of file parts in a directory. When this happens, the minimal utilization percentage increases by n−1/n, where n>=4. Thus, n=5 produces a minimal utilization of ⅘=80%. In some embodiments, this calculation continues to increase the value of n as long as the number of files to be produced is greater than 512 files. At step 106, the files are combined (crushed), for example, using MapReduce in Hadoop.

One exemplary implementation, using pseudo code is shown below.

---

Start given Directory D and file list F
desired_file_size= 4 x 128MB (4 x a block size)
IF size(F) < 128 MB
    Crush F into single file
ELSE
    WHILE [ ( size(F) / desired_file_size) > 512 ]
    OR [ ( size(F) / desired_file_size) > Count(F) ]
    desired_file_size = desired_file_size + 128 MB
Crush F into new set of Files with block size = size(F) / desired_file_size

---

Figure 2:
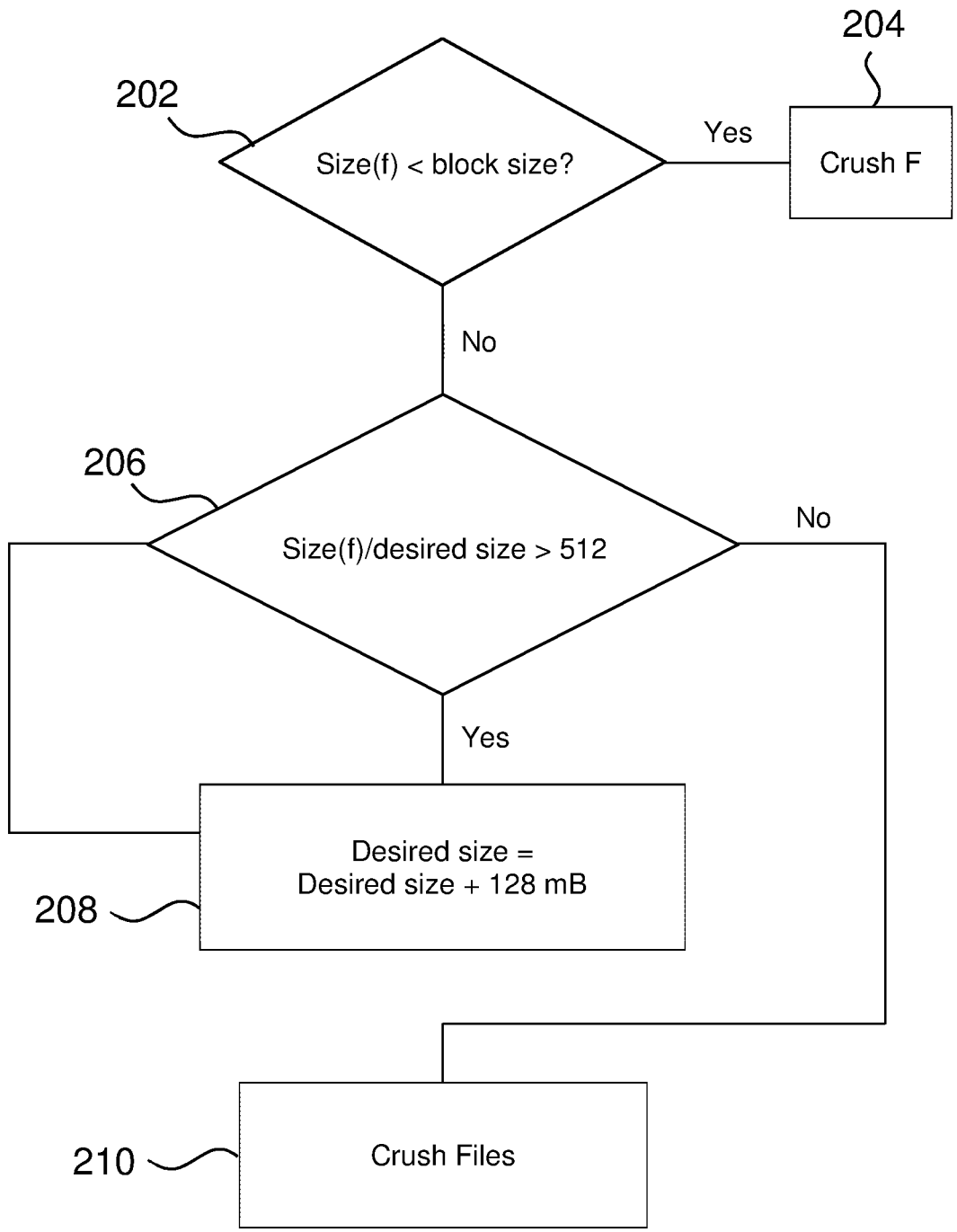
FIG. 2 illustrates a process for increasing file system utilization according to an embodiment.

FIG. 2 further illustrates this process according to an embodiment. At step 202, the system determines all of the files F in a directory D are less than a block size. In some embodiments the block size is 128 MB. If the size of the files are less than a block size, then at step 204 the files F are crushed into a single file. If the size of the files is not less than a block size, than at step 206 it is determined whether the size of the files divided by the desired file size is greater than a threshold, such as 512 MB. In this embodiment, the desired file size is initially set to 4 times a block size, where the block size is 128 MB. If the size of the files divided by the desired file size is greater than 512, then at step 208, the desired file size is increased by a block size. In this embodiment, the block size is 128 MB.

If the size of the files divided by the desired file size is not greater than 512, then at step 210 the files are crushed (combined). In some embodiments, the files are crushed such that the new set of files have a block size equal to the size of the original files divided by the desired file size. In some embodiments, at step 206, it is also determined whether the size of the files divided by the desired file size is greater than the number of files. In this embodiment if either condition at step 206 is true, the system goes on to step 208. Otherwise, the system crushes the files at step 210.

In some embodiments using MapReduce in Hadoop, given an input of size X and desired number of files N (which guarantee a minimum file system utilization of 75%) the system evenly distributes the data across nodes by creating surrogate keys used in the map and reduce phases. The surrogate key is a random number produced and it determines the shuffling and sorting of data in MapReduce.

Figure 3:
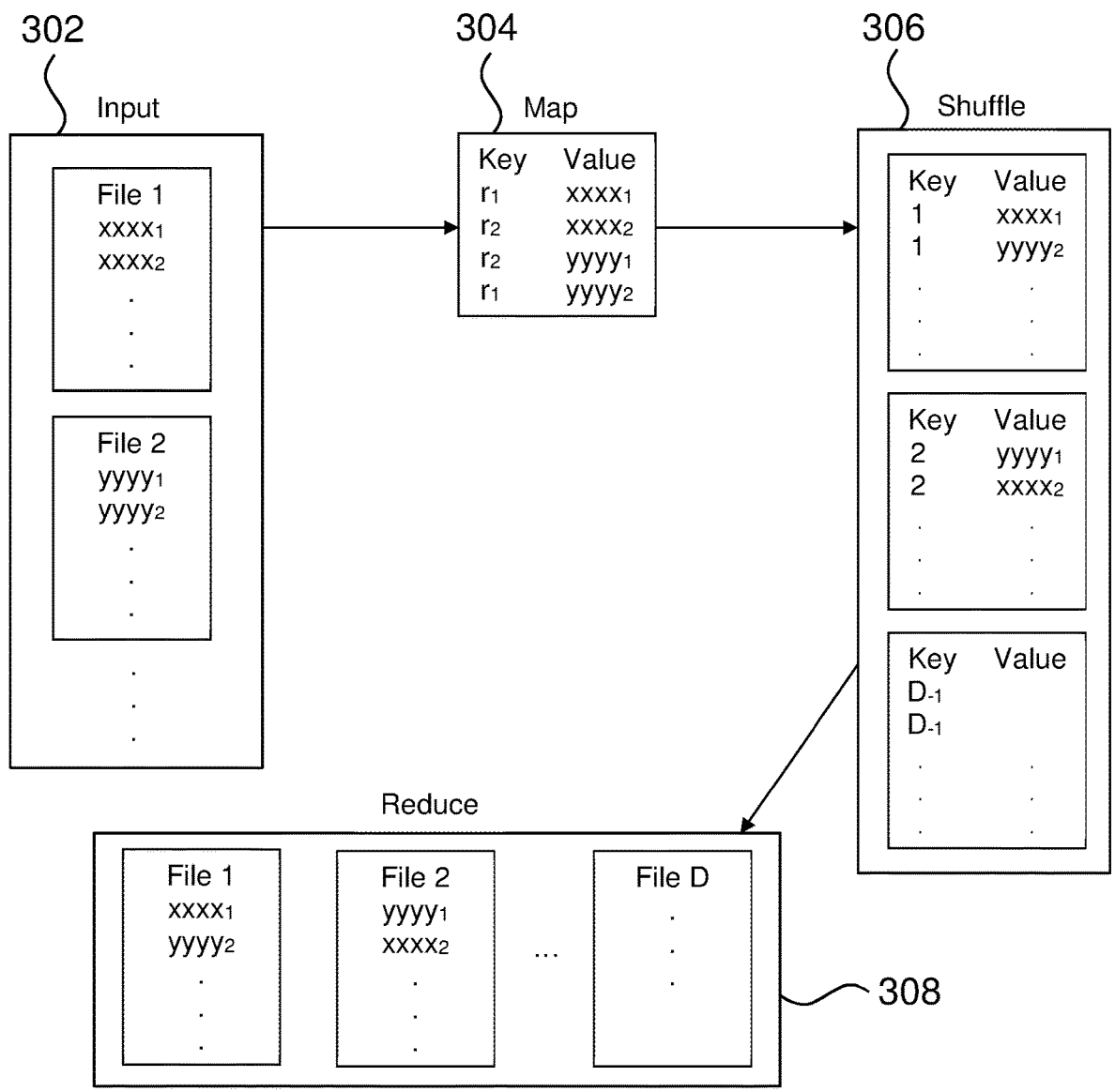
FIG. 3 illustrates a process for combing files in a distributed file system according to an embodiment.

FIG. 3 illustrates a process for combing files in a distributed file system according to an embodiment. In one embodiment, this process may be implemented as part of step 106 in FIG. 1. In this embodiment, the input 302 includes two files. Each file includes various file parts (data). File 1 includes data $xxxx_1$, $xxxx_2$ and so on. Likewise, File 2 includes data $yyyy_1$, $yyyy_2$, and so on. For illustrative purposes, two input files are shown, but any number of files can be part of the input 302.

Next, at 304 the system maps each file part to a key. The keys are random number, $r_1$, $r_2$, and so on. The random number is between 1 and the desired number of files. At 306, the file parts are shuffled into logical groupings based on the assigned keys. Thus, all file parts assigned to key $r_1$ are grouped together. At 308, the files are reduced. Each of the logical groups from 306 are written as a reduced output file. Thus, reduce output file 1 contains all of the file parts that were assigned to key $r_1$.

Figure 4:
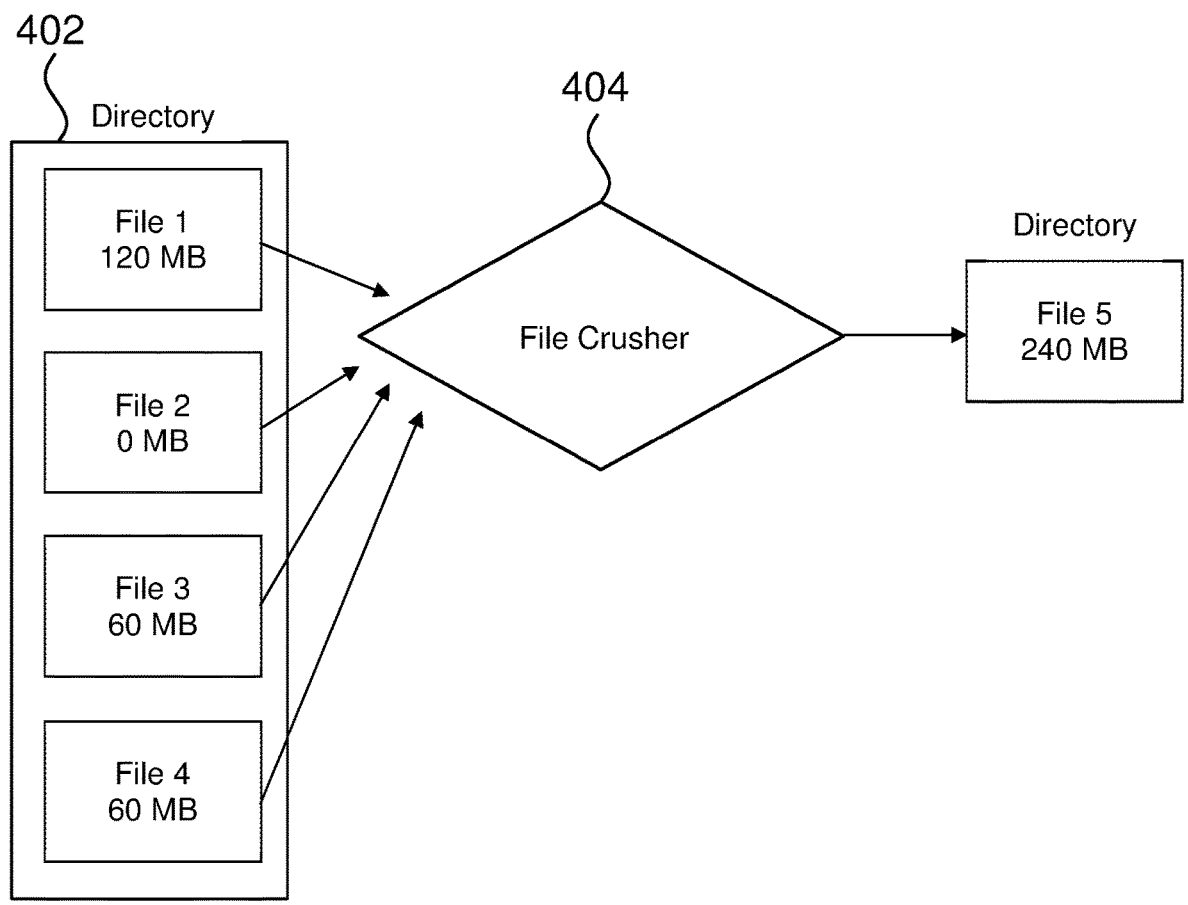
FIG. 4 illustrates an overview of distributed file system according to an embodiment.

FIG. 4 illustrates an overview of distributed file system according to an embodiment. The illustrated embodiment includes a directory 402. The directory includes four files, file 1-file 4. As shown, file 1 is 120 MB, file 2 is 0 MB (an empty file), file 3 is 60 MB, and file 4 is 60 MB. At 404, the files are combined, or crushed, using the process described above. After being crushed, a single file, file 5 is created. In the illustrated embodiment, all of the files in directory 402 are less then 512 MB. Therefore, based on the process illustrated in FIG. 2, the files in directory 402 are combined into a single file.

Figure 5:
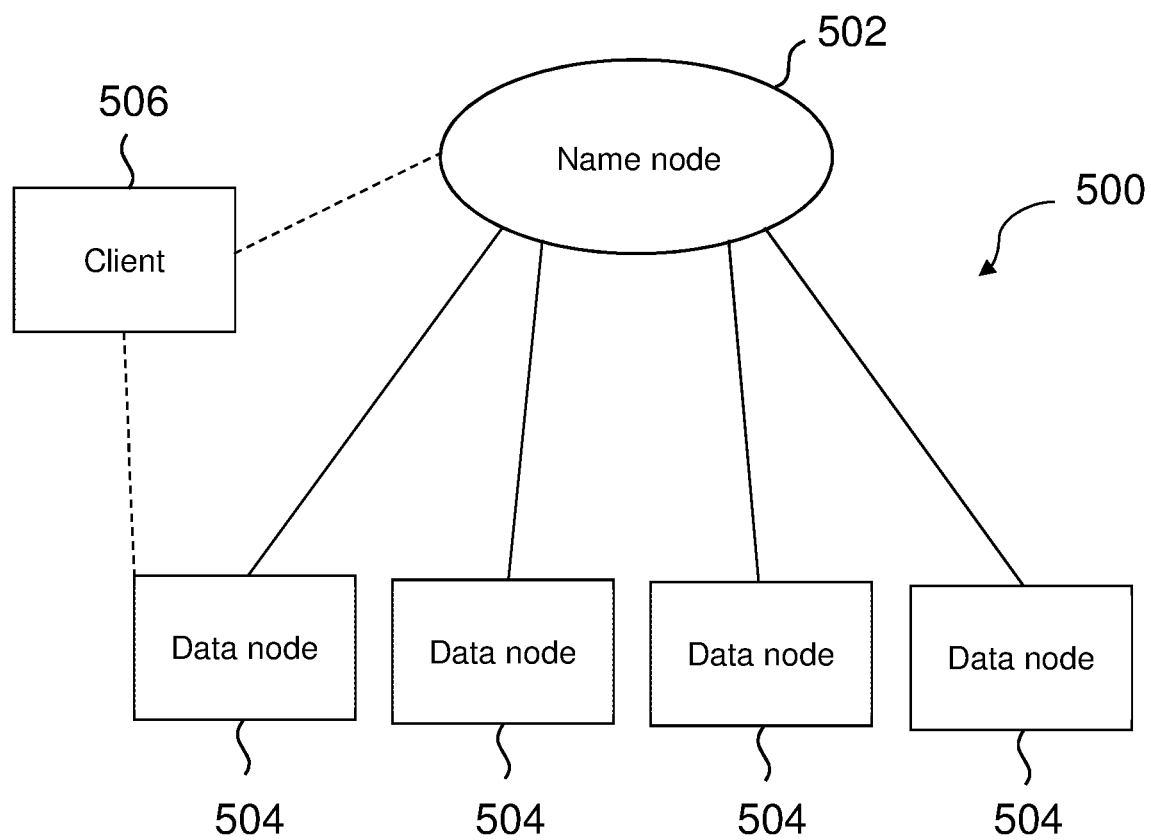
FIG. 5 is a system level diagram of a distributed file system according to an embodiment.

FIG. 5 is a system level diagram of a distributed file system. Embodiments of the invention provide a method for reducing the memory footprint on a distributed file system 500 namenode 502. The namenode 502 stores the metadata of a distributed file system 500. It includes the directory tree of all files in the file system, and tracks the files across the cluster. The namenode 502 does not store the actual data or the dataset. Some embodiments also provide a method for reducing the network traffic between the namenode 502 and various datanodes 504. Datanodes 504 store data in the distributed file system 500. Typically, a distributed file system 500 has more than one datanode 504, with data replicated across various nodes. The system can contain multiple namenodes 502 and datanodes 504. In some embodiments, a client may interact with a resource manager rather than namenode 502. The resource manager may efficiently communicate with namenode 502 and datanodes 504 to compute MapReduce functions. Therefore, the client 506 communicates with the namenode 502 either directly or indirectly through a resource manager.

Figure 6:
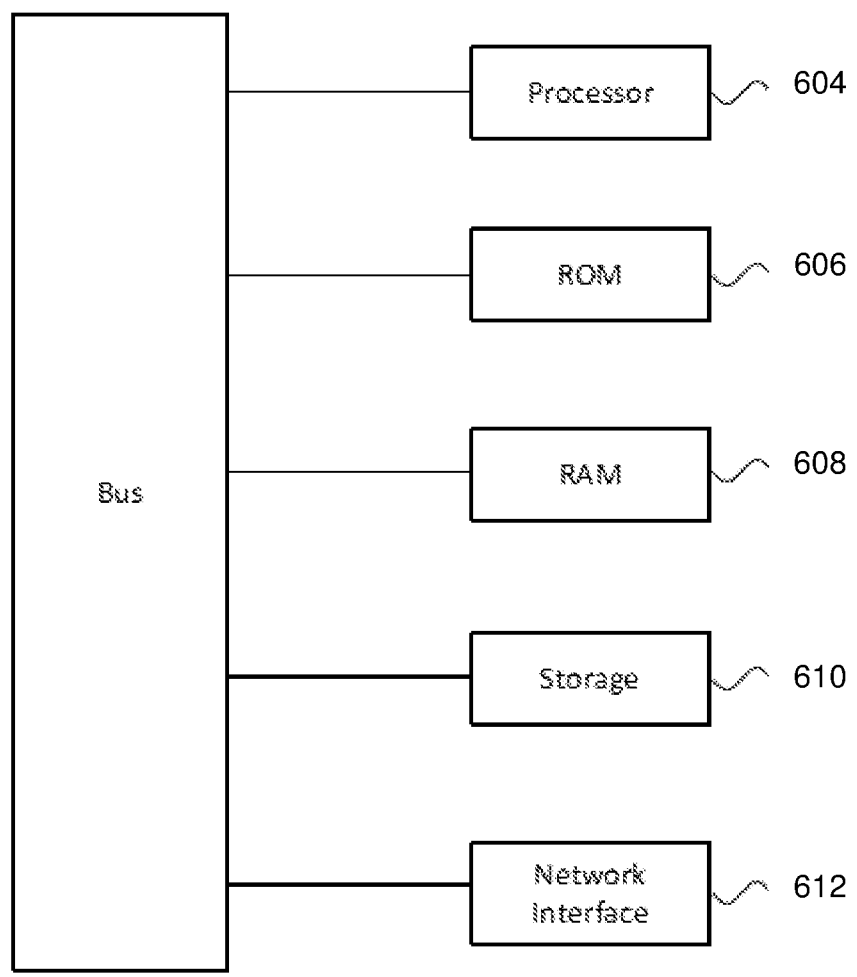
FIG. 6 is a block diagram of a processing system according to one embodiment.

FIG. 6 is a block diagram of a processing system according to one embodiment. The processing system includes a processor 604, such as a central processing unit (CPU), executes computer executable instructions comprising embodiments of the system for performing the functions and methods described above. In embodiments, the computer executable instructions are locally stored and accessed from a non-transitory computer readable medium, such as storage 610, which may be a hard drive or flash drive. Read Only Memory (ROM) 606 includes computer executable instructions for initializing the processor 604, while the random-access memory (RAM) 608 is the main memory for loading and processing instructions executed by the processor 604. The network interface 612 may connect to a wired network or cellular network and to a local area network or wide area network, such as the internet.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for optimizing a number of files stored in a distributed file system, the method comprising:

determining that the size of a plurality of input files in a directory is less than a block size, wherein each file in the plurality of input files comprises a plurality of file parts;

in response to determining that the size of a plurality of input files in the directory is less than a block size, combining the plurality of input files into a reduced set of files;

in response to determining that the size of a second plurality of input files in a second directory is not less than a block size, determining that the size of the second plurality of input files in the second directory divided by a desired file size is greater than a threshold, wherein each file in the second plurality of input files comprises a plurality of file parts;

in response to determining that the size of the second plurality of input files in the second directory divided by a desired file size is greater than a threshold, increasing the desired file size by a block size; and in response to determining that the size of the second plurality of input files in the second directory divided by a desired file size is not greater than a threshold, combining the second plurality of input files into a second reduced set of files, wherein combining the second plurality of input files comprises:

assigning a random number to each of the plurality of file parts for each file in the second plurality of input files;

grouping the plurality of file parts based on the assigned random numbers to generate a shuffled plurality of file parts; and reducing the shuffled plurality of file parts based on the assigned random number, wherein all file parts with the same random number are reduced to a same reduced file, and the reduced file has a block size equal to the size of the second plurality of input files divided by the desired file size.

2. The method of claim 1 wherein the threshold results in a minimum file system utilization of 75%.

3. The method of claim 1 wherein the random number is between one and a desired number of files.

4. The method of claim 1 further comprising writing the reduced plurality of file parts to a plurality of output files.

5. The method of claim 1 wherein the block size is 128 MB.

6. The method of claim 1 wherein the distributed file system stores files on a plurality of servers.

7. The method of claim 1 further comprising storing metadata for the reduced set of files in a namenode.

8. A distributed file system comprising one or more processors which, alone or in combination, are configured to provide for performance of the following steps:

determining that the size of a plurality of input files in a directory is less than a block size, wherein each file in the plurality of input files comprises a plurality of file parts;

in response to determining that the size of a plurality of input files in the directory is less than a block size, combining the plurality of input files into a reduced set of files;

in response to determining that the size of a second plurality of input files in a second directory is not less than a block size, determining that the size of the second plurality of input files in the second directory divided by a desired file size is greater than a threshold, wherein each file in the second plurality of input files comprises a plurality of file parts;

in response to determining that the size of the second plurality of input files in the second directory divided by a desired file size is greater than a threshold, increasing the desired file size by a block size; and in response to determining that the size of the second plurality of input files in the second directory divided by a desired file size is not greater than a threshold, combining the second plurality of input files into a second reduced set of files, wherein combining the second plurality of input files comprises:

assigning a random number to each of the plurality of file parts for each file in the second plurality of input files;

grouping the plurality of file parts based on the assigned random numbers to generate a shuffled plurality of file parts; and reducing the shuffled plurality of file parts based on the assigned random number, wherein all file parts with the same random number are reduced to a same reduced file, and the reduced file has a block size equal to the size of the second plurality of input files divided by the desired file size.

9. The system according to claim 8 further comprising steps for writing the reduced plurality of file parts to a plurality of output files.

10. A non-transitory computer readable medium storing instructions that when executed by a processor perform the following steps:

determining that the size of a plurality of input files in a directory is less than a block size, wherein each file in the plurality of input files comprises a plurality of file parts;

in response to determining that the size of a plurality of input files in the directory is less than a block size, combining the plurality of input files into a reduced set of files:

in response to determining that the size of a second plurality of input files in a second directory is not less than a block size, determining that the size of the second plurality of input files in the second directory divided by a desired file size is greater than a threshold, wherein each file in the second plurality of input files comprises a plurality of file parts;

in response to determining that the size of the second plurality of input files in the second directory divided by a desired file size is greater than a threshold, increasing the desired file size by a block size; and in response to determining that the size of the second plurality of input files in the second directory divided by a desired file size is not greater than a threshold, combining the second plurality of input files into a second reduced set of files, wherein combining the second plurality of input files comprises:

assigning a random number to each of the plurality of file parts for each file in the second plurality of input files;

grouping the plurality of file parts based on the assigned random numbers to generate a shuffled plurality of file parts; and reducing the shuffled plurality of file parts based on the assigned random number, wherein all file parts with the same random number are reduced to a same reduced file, and the reduced file has a block size equal to the size of the second plurality of input files divided by the desired file size.

11. The non-transitory computer readable medium according to claim 10 further comprising instructions for writing the reduced plurality of file parts to a plurality of output files.

12. The non-transitory computer readable medium according to claim 10 further comprising instructions for storing metadata for the reduced set of files in a namenode.

\* \* \* \* \*